United States Patent
Staake et al.

(10) Patent No.: US 9,995,370 B2
(45) Date of Patent: Jun. 12, 2018

(54) COUPLING ASSEMBLY AND TRANSMISSION ASSEMBLY

(71) Applicant: Bayerische Motoren Werke Aktiengesellschaft, Munich (DE)

(72) Inventors: Michael Staake, Munich (DE); Michael Hombauer, Harthausen (DE); Nikola Brk, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days. days.

(21) Appl. No.: 15/464,416

(22) Filed: Mar. 21, 2017

(65) Prior Publication Data

US 2017/0191551 A1    Jul. 6, 2017

Related U.S. Application Data

(63) Continuation of application No. PCT/EP2015/076178, filed on Nov. 10, 2015.

(30) Foreign Application Priority Data

Nov. 26, 2014   (DE) .................. 10 2014 224 056

(51) Int. Cl.
   *F16H 3/66*   (2006.01)

(52) U.S. Cl.
   CPC ....... *F16H 3/66* (2013.01); *F16H 2200/0021* (2013.01); *F16H 2200/0039* (2013.01); *F16H 2200/2007* (2013.01); *F16H 2200/2038* (2013.01)

(58) Field of Classification Search
   None
   See application file for complete search history.

(56) References Cited

U.S. PATENT DOCUMENTS

| 4,479,404 A | 10/1984 | Stockton |
| 2012/0129646 A1 | 5/2012 | Kim |
| 2014/0148298 A1 | 5/2014 | Lee et al. |

FOREIGN PATENT DOCUMENTS

| DE | 10 2010 032 256 A1 | 1/2012 |
| DE | 10 2011 052 401 A1 | 5/2012 |
| DE | 10 2013 112 984 A1 | 5/2014 |

(Continued)

OTHER PUBLICATIONS

German-language Search Report issued in counterpart German Application No. 10 2014 224 056.5 dated Jul. 24, 2015 with partial English translation (11 pages).

(Continued)

*Primary Examiner* — Dirk Wright
(74) *Attorney, Agent, or Firm* — Crowell & Moring LLP

(57) ABSTRACT

A coupling assembly is provided for a transmission assembly, in particular for a multiple spider planetary gear transmission, wherein the transmission assembly has two speed-change gear units coupled to each other. A first shaft and a second shaft are coupleable with one of the speed-change gear units, wherein by blocking of one of the shafts two shifting stages of the transmission assembly are shiftable. A third shaft is provided as well as a first shifting element and a second shifting element, each of which couples the first shaft and the second shaft with the third shaft. A third shifting element is provided which can brake and/or block the third shaft.

16 Claims, 3 Drawing Sheets

(56) References Cited

FOREIGN PATENT DOCUMENTS

DE 102015208355 A1 * 11/2016 ............... F16H 3/66
WO WO 2014/029650 A1 2/2014

OTHER PUBLICATIONS

International Search Report (PCT/ISA/210) issued in PCT Application No. PCT/EP2015/076178 dated Feb. 10, 2016 with English translation (6 pages).
German-language Written Opinion (PCT/ISA/237) issued in PCT Application No. PCT/EP2015/076178 dated Feb. 10, 2016 (5 pages).

* cited by examiner

COUPLING ASSEMBLY AND TRANSMISSION ASSEMBLY

CROSS REFERENCE TO RELATED APPLICATIONS

This application is a continuation of PCT International Application No. PCT/EP2015/076178, filed Nov. 10, 2015, which claims priority under 35 U.S.C. §119 from German Patent Application No. 10 2014 224 056.5, filed Nov. 26, 2014, the entire disclosures of which are herein expressly incorporated by reference.

BACKGROUND AND SUMMARY OF THE INVENTION

The invention relates to a coupling assembly for a transmission assembly, in particular for a multiple spider planetary gear mechanism, the transmission assembly having two speed-change gear mechanisms which are coupled to one another. Furthermore, the invention relates to a transmission assembly, in particular for a drive device of a vehicle, in particular for a vehicle having an electric motor, having an input shaft, an output shaft, two speed-change gear mechanisms which are coupled to one another and a coupling assembly.

Transmission assemblies having a plurality of speed-change gear mechanisms are known from the prior art. A plurality of transmission ratios can be switched by way of corresponding coupling of the speed-change gear mechanisms among one another. For example, planetary gear mechanisms which are coupled to one another are used as speed-change gear mechanisms, it being possible for individual elements of one or both planetary gear mechanisms to be braked or blocked by way of shifting elements, for example brakes or clutches. Here, as is also the case in other transmissions, shifting of the individual gears without load interruption is possible if a suitable clutch is used.

For example, a multiple spider planetary gear mechanism is known, in which the sun gear of a first planetary gear mechanism is coupled to an input shaft, and the spider which supports the planetary gears is coupled to an output shaft. The spiders of both planetary gear mechanisms are coupled in each case to the internal gear of the other planetary gear mechanism. A first shifting element can block the spider of the second planetary gear mechanism, and a second shifting element can block the sun gear of the second planetary gear mechanism.

If the first shifting element is actuated, the spider of the second planetary gear mechanism and therefore that internal gear of the first planetary gear mechanism which is coupled to it are blocked. The power flow takes place directly from the sun gear of the first planetary gear mechanism via its planetary gears and the spider to the output shaft.

In contrast, only the sun gear of the second planetary gear mechanism is blocked by way of blocking of the second shifting element. All other components can move, with the result that the power flow takes place via both planetary gear mechanisms, as a result of which a second gear is realized. However, an increase in the number of gears is possible only by way of a plurality of planetary gear mechanisms, as a result of which a greater amount of installation space is required.

In the case of the transmission assemblies which are known from the prior art, generally either the number of gears is very limited, or a large number of shifting elements and/or speed-change gear mechanisms are required, in order to select the individual gears. As a result, the construction and the control of the transmission assemblies are very complicated.

It is an object of the invention to provide a coupling assembly for a transmission assembly of this type, which coupling assembly has a simpler construction and makes the selecting of a plurality of gears possible. Furthermore, it is an object of the invention to provide a transmission assembly which has a simpler construction and by way of which as large a number of gears as possible can be selected with a small number of shifting elements.

In order to achieve the object, a coupling assembly for a transmission assembly is provided, in particular for a multiple spider planetary gear mechanism. The transmission assembly has two speed-change gear mechanisms which are coupled to one another, a first shaft and a second shaft which can be coupled to one of the speed-change gear mechanisms and a third shaft. It is possible for two shift stages of the transmission assembly to be shifted by way of the blocking of, in each case, one of the first and second shafts. A first shifting element and a second shifting element are provided which, in each case, couple the first shaft and the second shaft to the third shaft, and a third shifting element is provided which can brake and/or block the third shaft.

By way of the coupling assembly according to the invention, shifting of a total of three gears is possible in the case of two speed-change gear mechanisms with three shifting elements. In the case of a blocked third shifting element, two gears can be realized by way of shifting of the first and the second shifting element. A third gear can be provided by both the first and the second shifting element being shifted while the third shaft is released by way of the third shifting element. In this shifting position, the first and the second shaft are coupled to one another, with the result that a third gear, that is to say a third transmission ratio, is produced by way of the coupling of the speed-change gear mechanisms which are connected to the shafts.

The first, the second and/or the third shifting element can be formed in each case by a brake which blocks the respective shaft, that is to say arrests it completely.

The first, the second and/or the third shifting element can also be formed, however, in each case by a clutch, with the result that slow coupling or blocking of the respective shafts and therefore a gentle transition between the transmission ratios, that is to say the individual gear stages, are possible.

The clutches are preferably configured as a multiple disk clutch, by way of which a satisfactory transmission of power with a low installation space is possible.

In order to ensure a loss-free drive, a bearing is preferably provided for the first, the second and the third shaft, with the result that these shafts can rotate with minimal friction.

In order to achieve the object, furthermore, a transmission assembly, in particular for a drive device of a vehicle, in particular for a vehicle having an electric motor, is provided, having an input shaft, an output shaft and two speed-change gear mechanisms which are coupled to one another, and having a coupling assembly according to the invention. The first and the second shaft are coupled to the first and/or the second speed-change gear mechanism, and it is possible for three transmission ratios between the input shaft and the output shaft to be selected by way of selective shifting of the three shifting elements.

The speed-change gear mechanisms are, for example, planetary gear mechanisms which in each case have a sun gear, a plurality of planetary gear mechanisms which are mounted on a spider, and an internal gear. The planetary gear mechanisms make a very compact construction of the transmission assembly possible. Shifting of the gears without load interruption is possible.

In the case of a transmission assembly of this type, the spider of the first speed-change gear mechanism is preferably coupled to the internal gear of the second speed-change gear mechanism, and the spider of the second speed-change gear mechanism is coupled to the internal gear of the first speed-change gear mechanism. Depending on the shifting and/or arrangement of the shifting elements, merely the first planetary gear mechanism can be utilized for speed changing, or the load path passes from the first planetary gear mechanism via the second planetary gear mechanism.

In one preferred embodiment, the first shaft of the coupling assembly is coupled to the spider of the second speed-change gear mechanism, and the second shaft of the coupling assembly is coupled to the sun gear of the second speed-change gear mechanism. In the case of a blocked third shaft, a first gear can be shifted by the first shifting element blocking the spider of the second speed-change gear mechanism and therefore the internal gear of the first speed-change gear mechanism. The power flow takes place directly from the sun gear of the first planetary gear mechanism via its planetary gear mechanism and the spider to an output shaft. If the second shaft is blocked by the second shifting element, merely the sun gear of the second speed-change gear mechanism is arrested, with the result that the power flow takes place via both planetary gear mechanisms. A third gear is shifted by the third shaft being released, that is to say the third shifting element being opened, while the first and the second shifting element are closed. As a result, the first shaft is coupled to the second shaft, the planetary gear mechanisms being blocked by way of the coupling action, with the result that both planetary gear mechanisms rotate together and a third gear is shifted.

The input shaft is preferably coupled to the sun gear of the first speed-change gear mechanism, and the output shaft is coupled to the spider of the first speed-change gear mechanism.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
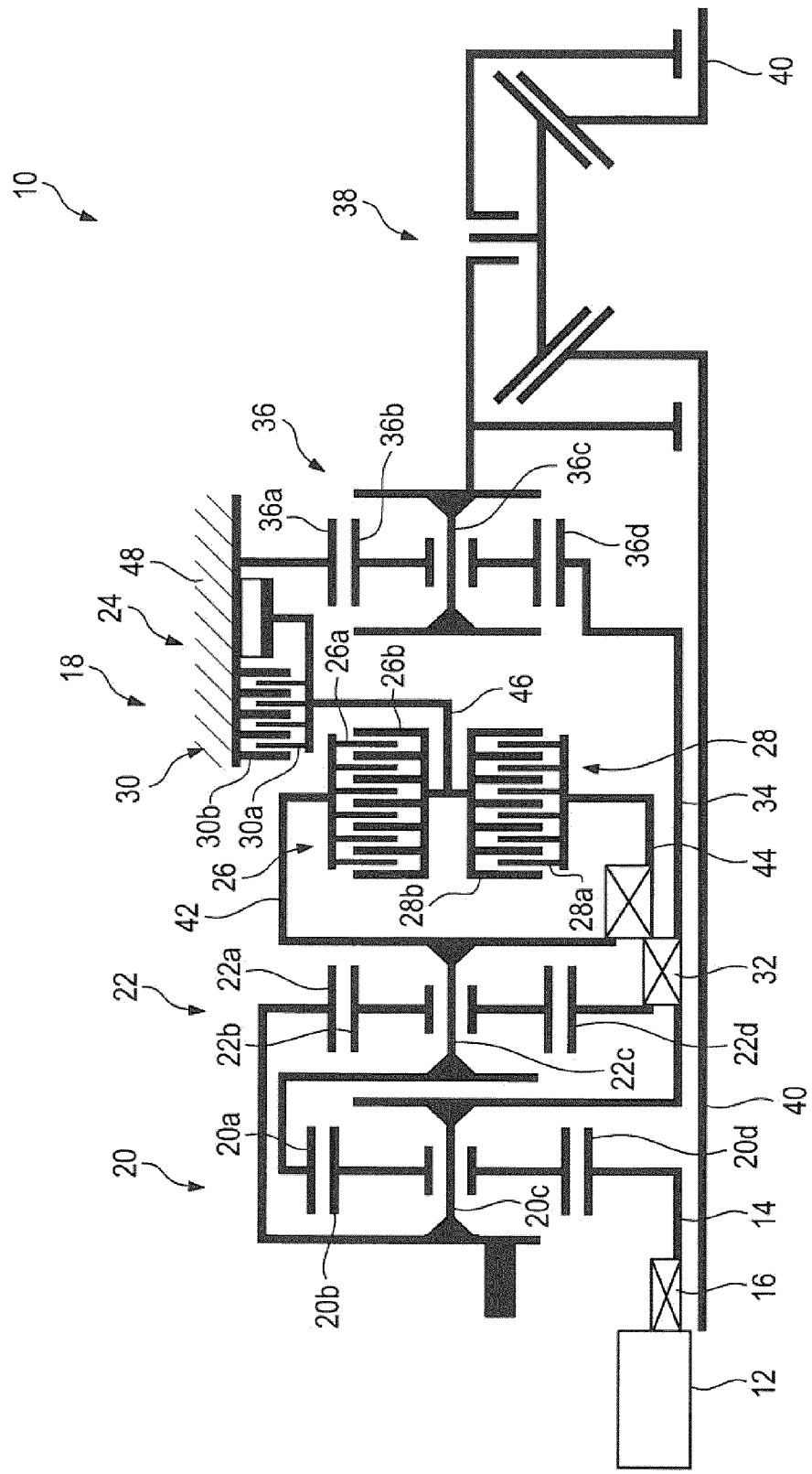
FIG. 1 is a schematic diagram of a transmission assembly according to an embodiment of the invention.

FIG. 1 shows a drive device 10 for a vehicle, in particular an electric vehicle. The drive device 10 has a motor 12 which drives an input shaft 14. The input shaft 14 has a bearing 16, by way of which the input shaft 14 is mounted in the vehicle.

Furthermore, a transmission assembly 18 is provided, by way of which, as will be explained in the following text, a plurality of transmission ratios can be selected. The transmission assembly 18 has a first speed-change gear mechanism 20, a second speed-change gear mechanism 22 and a coupling assembly 24 which has a first shifting element 26, a second shifting element 28, a third shifting element 30 and three shafts 42, 44, 46.

An output shaft 34 which is mounted rotatably by way of a bearing 32 is connected downstream of the transmission assembly 18, which output shaft 34 drives the drive axles 40 via a third speed-change gear mechanism 36 and a differential 38.

The first speed-change gear mechanism 20, the second speed-change gear mechanism 22 and the third speed-change gear mechanism 36 are configured in each case as planetary gear mechanisms, having a sun gear 20d, 22d, 36d, planetary gears 20b, 22b, 36b which are mounted in each case on a spider 20c, 22c, 36c, and an internal gear 20a, 22a, 36a.

The input shaft 14 is connected to the sun gear 20d of the first speed-change gear mechanism 20. The output shaft 34 is connected to the spider 20c of the first speed-change gear mechanism 20.

The internal gear 20a of the first speed-change gear mechanism 20 is connected to that spider 22c of the second speed-change gear mechanism 22 which supports the sun gears 22d. The internal gear 22a of the second speed-change gear mechanism 22 is connected to the spider 20c of the first speed-change gear mechanism 20.

The first shaft 42 is coupled to the spider 22c of the second speed-change gear mechanism 22, and the second shaft 44 is coupled to the sun gear 22d of the second speed-change gear mechanism 22.

The first shifting element 26 is arranged between the first shaft 42 and the third shaft 46 and can couple them to one another. The second shifting element 28 is arranged between the second shaft 44 and the third shaft 46 and can couple them.

The third shifting element 30 can brake and/or block the third shaft 46.

The three shifting elements 26, 28, 30 are configured in each case as a multiple disk clutch. It is also contemplated, however, that other types of clutches or types of brakes are used.

The shifting possibilities for the transmission assembly 18 and the coupling assembly 24 will be explained in the following text.

For the first two gears, the third shifting element 30 is closed, that is to say it blocks the third shaft 46.

By way of closure of the first shifting element 26, the first shaft 42 is coupled to the third shaft 46, that is to say is likewise blocked. As a result, the spider 22c of the second speed-change gear mechanism 22 is fixed, with the result that that internal gear 20a of the first speed-change gear mechanism 20 which is coupled to said spider 22c is also arrested (blocked).

The sun gear 20d of the first speed-change gear mechanism 20 which is driven by the input shaft 14 thus drives the planetary gears 20b which roll in the blocked internal gear 20a and therefore circulate about the sun gear 20d. The spider 20c moves together with the planetary gears 20b which circulate about the sun gear, and drives the output shaft 34. The transmission ratio therefore depends on the transmission ratios of the sun gear 20d with respect to the planetary gears 20b and of the planetary gears 20b with respect to the internal gear 20a.

In order to select the second gear, the first shifting element 26 is opened and the second shifting element 28 is closed, with the result that the second shaft 44 is coupled to the blocked third shaft 46. As a result, the sun gear 22*d* of the second speed-change gear mechanism 22 is blocked, while all other components of both speed-change gear mechanisms 20, 22 can move.

The power flow takes place from the input shaft 14 via the sun gear 20*d* to the planetary gears 20*b* and from there via the internal gear 20*a* to the spider 22*c* of the second speed-change gear mechanism 22. From there, the power flow takes place via the planetary gears 22*b* and the internal gear 22*a* to the spider 20*c* of the first speed-change gear mechanism 20 and further to the output shaft 34.

For a third gear, the third shifting element 30 is opened, with the result that the third shaft 46 can be rotated. The first shifting element 26 and the second shifting element 28 are closed, with the result that the first shaft 42 is coupled to the second shaft 44.

As a result, the spider 22*c* is coupled to the sun gear 22*d*. The planetary gears 22*b* are blocked relative to the sun gear 22*d* via the spider 22*c*, with the result that they rotate together with the sun gear 22*d* about the second shaft 44. On account of the planetary gears 22*b* which are blocked in this way, the internal gear 22*a* is also coupled fixedly to the sun gear 22*d* and the spider 22*c*. The entire second speed-change gear mechanism 22 is therefore blocked within itself, but can rotate as an entire unit on account of the open or released third shaft 46.

Since the internal gear 20*a* of the first speed-change gear mechanism 20 is coupled to the spider 22*c* and the spider 20*c* is coupled to the internal gear 22*a*, they are also connected fixedly to the second speed-change gear mechanism 22 and can rotate together with it. Since the internal gear 20*a* and the spider 20*c* are fixed relative to one another as a result of this connection, the planetary gears 20*b* are also fixed relative to the internal gear 20*a* and to the spider 20*c*.

The input shaft 14 drives the sun gear 20*d* which drives the entire remaining unit which is blocked in itself comprising the second speed-change gear mechanism 22 and the planetary gears 20*b*, the spider 20*c* and the internal gear 20*a* of the first speed-change gear mechanism. In this case, the transmission ratio is dependent exclusively on the planetary gears 20*b* and the sun gear 20*d* of the first speed-change gear mechanism 20.

As a result of the combination of the various shifting elements 26, 28, 30, three different transmission ratios can therefore be selected by way of two speed-change gear mechanisms 20, 22, as a result of which a more compact construction of a transmission assembly 18 is possible.

Figure 2:
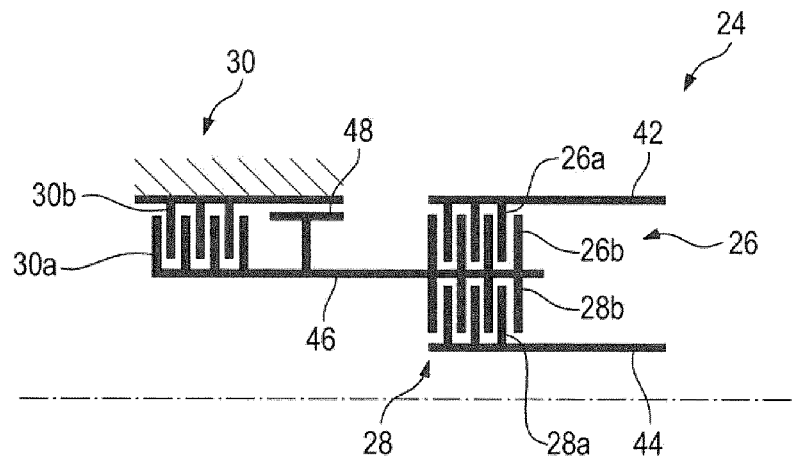
FIG. 2 is a schematic diagram of the coupling assembly of the transmission assembly from FIG. 1.
Figure 3:
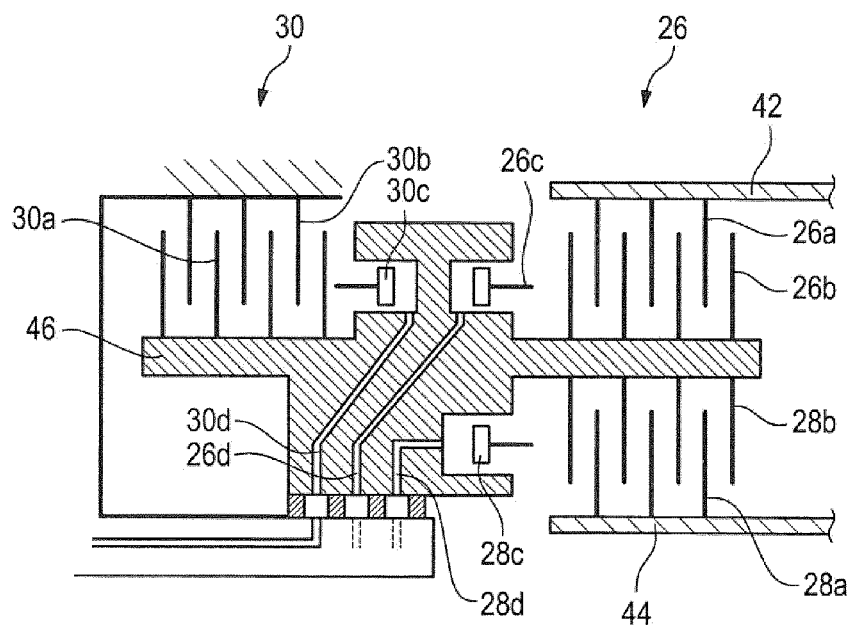
FIG. 3 is a detailed view of the coupling assembly from FIG. 2.

FIGS. 2 and 3 show the coupling assembly 24 in detail.

FIG. 2 shows the coupling assembly 24 in a merely simplified manner, having a first shaft 42, the second shaft 44 and the third shaft 46, as well as the first shifting element 26, the second shifting element 28 and the third shifting element 30. The bearing 48, fixed on the housing, of the third shaft 46 is further shown.

FIG. 3 shows the precise construction of the coupling assembly 24.

Here, the shifting elements 26, 28, 30 are configured in each case as a multiple disk brake, which multiple disk brakes have in each case two multiple disk groups 26*a*, 28*a*, 30*a* and 26*b*, 28*b*, 30*b* and in each case one hydraulically movable actuating element 26*c*, 28*c*, 30*c*. Rotary leadthroughs 30*d*, 26*d*, 28*d* for the hydraulic lines are provided in each case on the third shaft 46, in order to actuate the actuating elements 26*c*, 28*c*, 30*c*.

As an alternative, the actuating elements 26*c*, 28*c*, 30*c* can also be served from a fixed part or a carrier, with the result that rotary leadthroughs of this type are not necessary. In this case, the power loss of the system is reduced, since it is simpler to seal the hydraulic lines.

The multiple disk group 26*a*, 28*a*, 30*a*, 26*b*, 28*b*, 30*b* and the shifting elements 26, 28, 30 can be in each case of identical construction, with the result that identical parts can be used in each case and the construction costs can be reduced as a result.

As an alternative, the shifting elements 26, 28, 30 can also be dimensioned in each case with respect to the torque to be transmitted, with the result that the installation space of the shifting elements 26, 28, 30 can be reduced.

As can be seen in FIG. 1, the coupling assembly 24 is used for a transmission assembly 18 which has two planetary gear mechanisms which are coupled to one another and two shafts 42, 44.

Figure 4:
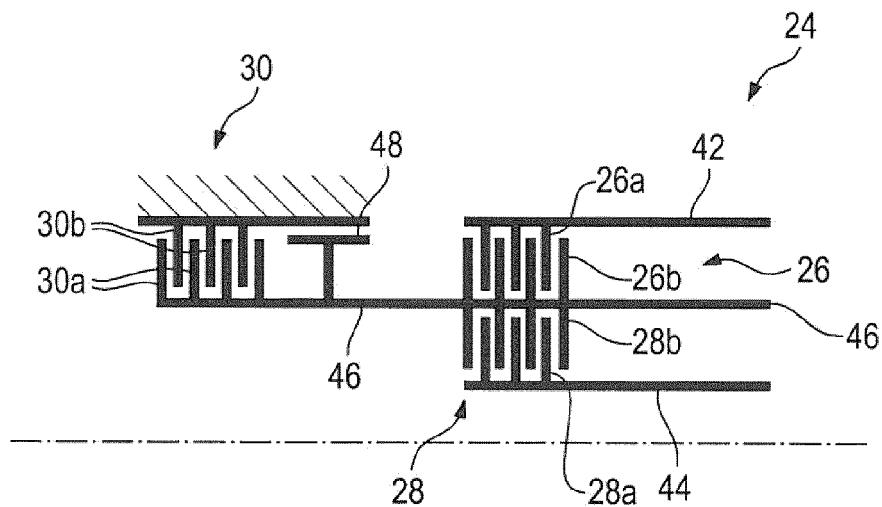
FIG. 4 is a schematic diagram of a second embodiment of a coupling assembly according to the invention.

FIG. 4 shows a further embodiment of a coupling assembly 24 of this type, the third shaft 46 being lengthened here, with the result that a speed-change gear mechanism can also be arranged on the third shaft 46. As a result, the functionality and the transmission options of a transmission assembly are increased.

Figure 5:
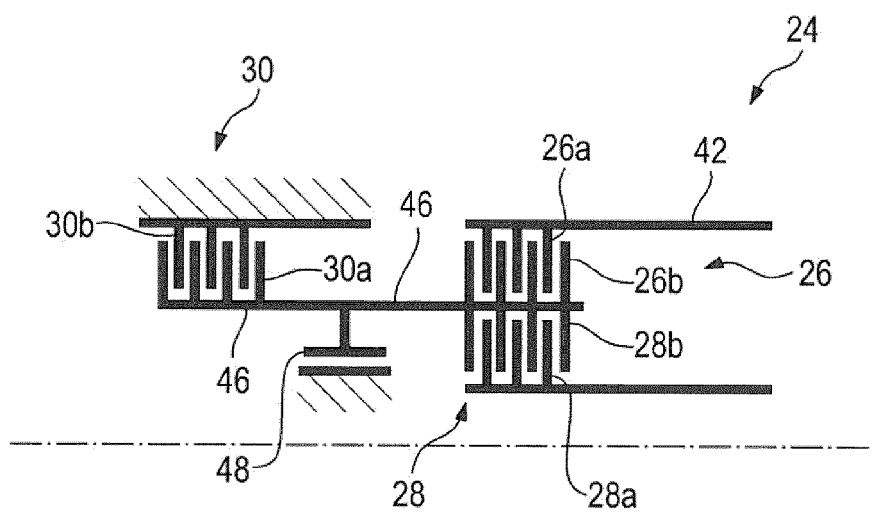
FIG. 5 is a schematic diagram of a third embodiment of a coupling assembly according to the invention.

FIG. 5 shows a further embodiment, the bearing of the third shaft 46 being separate here from the bearing of the third shifting element 30.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A coupling assembly for a transmission assembly having two speed-change gear mechanisms coupled to one another, the coupling assembly comprising:
    a first shaft and a second shaft coupleable to one of the two speed-change gear mechanisms, wherein two shift stages of the transmission assembly are shiftable by blocking of, in each case, one of the first and second shafts;
    a third shaft;
    a first shifting element and a second shifting element which, in each case, couple the first shaft and the second shaft to the third shaft; and
    a third shifting element that can brake and/or block the third shaft.

2. The coupling assembly according to claim 1, wherein the first shifting element, the second shifting element and/or the third shifting element are, in each case, formed by a brake.

3. The coupling assembly according to claim 1, wherein the first shifting element, the second shifting element and/or the third shifting element are, in each case, formed by a clutch.

4. The coupling assembly according to claim 3, wherein the clutch is a multiple disk clutch.

5. The coupling assembly according to claim 1, further comprising one bearing respectively provided for each of the first, second and third shafts.

6. A coupling assembly according to claim 1, wherein the coupling assembly is configured for a multiple spider planetary gear mechanism transmission assembly.

7. A transmission assembly, comprising:
    an input shaft;
    first and second speed-change gear mechanisms coupled to one another;

a coupling assembly comprising:
  a first shaft and a second shaft coupleable to one of the two speed-change gear mechanisms, wherein two shift stages of the transmission assembly are shiftable by blocking of, in each case, one of the first and second shafts;
  a third shaft;
  a first shifting element and a second shifting element which, in each case, couple the first shaft and the second shaft to the third shaft; and
  a third shifting element that can brake and/or block the third shaft, wherein
the first shaft and the second shaft are coupled to the first speed-change mechanism and/or the second speed-change mechanism, and
three transmission ratios between the input shaft and the output shaft are selectable via selective shifting of the first, second, and third shifting elements.

8. The transmission assembly according to claim 7, wherein
  the two speed-change gear mechanisms are planetary gear mechanisms which, in each case, comprise a sun gear, a plurality of planetary gears mounted on a spider, and an internal gear.

9. The transmission assembly according to claim 8, wherein
  the spider of the first speed-change gear mechanism is coupled to the internal gear of the second speed-change gear mechanism, and
  the spider of the second speed-change gear mechanism is coupled to the internal gear of the first speed-change gear mechanism.

10. The transmission assembly according to claim 9, wherein
  the first shaft of the coupling assembly is coupled to the spider of the second speed-change gear mechanism, and
  the second shaft of the coupling assembly is coupled to the sun gear of the second speed-change gear mechanism.

11. The transmission assembly according to claim 8, wherein
  the first shaft of the coupling assembly is coupled to the spider of the second speed-change gear mechanism, and
  the second shaft of the coupling assembly is coupled to the sun gear of the second speed-change gear mechanism.

12. The transmission assembly according to claim 8, wherein
  the input shaft is coupled to the sun gear of the first speed-change gear mechanism, and
  the output shaft is coupled to the spider of the first speed-change gear mechanism.

13. The transmission assembly according to claim 9, wherein
  the input shaft is coupled to the sun gear of the first speed-change gear mechanism, and
  the output shaft is coupled to the spider of the first speed-change gear mechanism.

14. The transmission assembly according to claim 10, wherein
  the input shaft is coupled to the sun gear of the first speed-change gear mechanism, and
  the output shaft is coupled to the spider of the first speed-change gear mechanism.

15. The transmission assembly according to claim 7, wherein the transmission assembly is configured for a drive device of a vehicle.

16. The transmission assembly according to claim 15, wherein the drive device is an electric motor.

* * * * *